US012748445B2

(12) United States Patent
Usuda

(10) Patent No.: US 12,748,445 B2
(45) Date of Patent: Sep. 29, 2026

(54) VOLTAGE REGULATOR

(71) Applicant: Kioxia Corporation, Tokyo (JP)

(72) Inventor: Masayuki Usuda, Tokyo (JP)

(73) Assignee: Kioxia Corporation, Tokyo (JP)

( * ) Notice: Subject to any disclaimer, the term of this patent is extended or adjusted under 35 U.S.C. 154(b) by 98 days.

(21) Appl. No.: 18/818,651

(22) Filed: Aug. 29, 2024

(65) Prior Publication Data

US 2024/0419200 A1 Dec. 19, 2024

Related U.S. Application Data

(60) Continuation of application No. 18/332,756, filed on Jun. 12, 2023, now Pat. No. 12,079,018, which is a continuation of application No. 17/893,772, filed on Aug. 23, 2022, now Pat. No. 11,675,377, which is a continuation of application No. 17/209,108, filed on Mar. 22, 2021, now Pat. No. 11,429,126, which is a continuation of application No. 16/786,030, filed on Feb. 10, 2020, now Pat. No. 10,955,866, which is a continuation of application No. 16/271,666, filed on Feb. 8, 2019, now Pat. No. 10,558,231, which is a continuation of application No. 15/888,438, filed on Feb. 5, 2018, now Pat. No. 10,209,724, which is a continuation of application No. 15/466,347, filed on (Continued)

(30) Foreign Application Priority Data

Nov. 1, 2012 (JP) ................................ 2012-241904

(51) Int. Cl.
*G05F 1/575* (2006.01)
*G05F 1/569* (2006.01)

(52) U.S. Cl.
CPC .............. *G05F 1/569* (2013.01); *G05F 1/575* (2013.01)

(58) Field of Classification Search
CPC ....... H02M 3/157; H02M 3/158; G05F 1/569; G05F 1/575; G05F 1/44; G05F 1/40
See application file for complete search history.

(56) References Cited

U.S. PATENT DOCUMENTS 5,212,616 A 5/1993 Dhong et al.
7,183,755 B2 2/2007 Itoh et al.

(Continued)

FOREIGN PATENT DOCUMENTS

JP H06-59910 A 8/1994
JP 2007-128454 A 5/2007
JP 2008-204018 A 9/2008

OTHER PUBLICATIONS

Japanese Office Action dated Dec. 15, 2015, filed in Japanese counterpart Application No. 2012-241904, 9 pages (with translation).

*Primary Examiner* — Adolf D Berhane
(74) *Attorney, Agent, or Firm* — Kim & Stewart LLP

(57) ABSTRACT

A voltage regulator includes an operational amplifier that compares a feedback voltage that is proportional to an output voltage and a predetermined reference voltage that corresponds to a desired output voltage. The operational amplifier controls the conduction state of an output transistor according to the comparison. A detecting circuit monitors the operating state of the operational amplifier, and in the case that the operational amplifier is not operating, outputs a signal which causes the output transistor to be placed in a non-conductive state.

20 Claims, 5 Drawing Sheets

Related U.S. Application Data

Mar. 22, 2017, now Pat. No. 9,886,046, which is a division of application No. 14/838,069, filed on Aug. 27, 2015, now Pat. No. 9,645,592, which is a division of application No. 14/015,990, filed on Aug. 30, 2013, now Pat. No. 9,141,120.

(56) References Cited

U.S. PATENT DOCUMENTS

| | | | | |
|---|---|---|---|---|
| 7,304,458 | B2 | 12/2007 | Kakinuma | |
| 7,646,188 | B2 | 1/2010 | Suzuki | |
| 8,710,914 | B1 | 4/2014 | Guhados et al. | |
| 9,104,223 | B2 * | 8/2015 | Zhong | G05F 1/575 |
| 9,141,120 | B2 | 9/2015 | Usuda | |
| 9,645,592 | B2 | 5/2017 | Usuda | |
| 9,886,046 | B2 | 2/2018 | Usuda | |
| 10,209,724 | B2 | 2/2019 | Usuda | |
| 10,558,231 | B2 | 2/2020 | Usuda | |
| 10,955,866 | B2 | 3/2021 | Usuda | |
| 11,429,126 | B2 | 8/2022 | Usuda | |
| 11,675,377 | B2 | 6/2023 | Usuda | |
| 12,079,018 | B2 * | 9/2024 | Usuda | G05F 1/575 |
| 2002/0118568 | A1 | 8/2002 | Tanzawa | |
| 2004/0130305 | A1 | 7/2004 | Agari et al. | |
| 2004/0245975 | A1 | 12/2004 | Tran et al. | |
| 2007/0268008 | A1 | 11/2007 | Gicquel et al. | |
| 2008/0180071 | A1 | 7/2008 | Moraveji | |
| 2010/0181972 | A1 | 7/2010 | Kawagoshi | |
| 2011/0121890 | A1 | 5/2011 | Kikuchi | |
| 2012/0098513 | A1 | 4/2012 | Terada et al. | |
| 2013/0038314 | A1 | 2/2013 | Nakashima | |
| 2014/0266118 | A1 | 9/2014 | Chern et al. | |
| 2014/0340067 | A1 | 11/2014 | Zhong et al. | |

* cited by examiner

VOLTAGE REGULATOR

CROSS-REFERENCE TO RELATED APPLICATIONS

This application is a continuation of U.S. patent application Ser. No. 18/332,756, filed on Jun. 12, 2023, which is a continuation of U.S. patent application Ser. No. 17/893,772, filed on Aug. 23, 2022, now U.S. Pat. No. 11,675,377, issued on Jun. 13, 2023, which is a continuation of U.S. patent application Ser. No. 17/209,108, filed on Mar. 22, 2021, now U.S. Pat. No. 11,429,126, issued on Aug. 30, 2022, which is a continuation of U.S. patent application Ser. No. 16/786,030, filed on Feb. 10, 2020, now U.S. Pat. No. 10,955,866, issued on Mar. 23, 2021, which is a continuation of U.S. patent application Ser. No. 16/271,666, filed on Feb. 8, 2019, now U.S. Pat. No. 10,558,231, issued on Feb. 11, 2020, which is a continuation of U.S. patent application Ser. No. 15/888,438, filed on Feb. 5, 2018, now U.S. Pat. No. 10,209,724, issued on Feb. 19, 2019, which is a continuation of U.S. patent application Ser. No. 15/466,347, filed on Mar. 22, 2017, now U.S. Pat. No. 9,886,046, issued on Feb. 6, 2018, which is a division of U.S. patent application Ser. No. 14/838,069, filed on Aug. 27, 2015, now U.S. Pat. No. 9,645,592, issued on May 9, 2017, which is a division of U.S. patent application Ser. No. 14/015,990, filed on Aug. 30, 2013, now U.S. Pat. No. 9,141,120, issued on Sep. 22, 2015, which is based upon and claims the benefit of priority from Japanese Patent Application No. 2012-241904, filed Nov. 1, 2012, the entire contents of each of which are incorporated herein by reference.

FIELD

The embodiment described herein relates generally to a voltage regulator for protecting a load circuit.

BACKGROUND

Conventional voltage regulators that have a configuration in which, to stabilize the output voltage, a feedback voltage that is proportional to the output voltage is compared to a reference voltage using an operational amplifier. The conductive state of an output transistor is controlled according to the results of that comparison. This configuration is useful when the input voltage is generally higher than the intended output voltage. But a voltage regulator may also be required to control output voltage even when the power supply voltage is lower than the operating range, such as at the time of power activation. For this reason, a configuration is used in which the power source voltage is monitored by a power source voltage-monitoring circuit, and the voltage regulator is started up when the power source voltage has risen to a sufficient level for the voltage regulator to operate.

However, in a method where a voltage regulator is started up only when the power source voltage becomes sufficient, the time ("start-up" time) from power activation to when the voltage regulator begins to operate becomes relatively long. There is also the problem that, by including a power source voltage-monitoring circuit with the voltage regulator circuit, the size of the semiconductor device that includes the voltage regulator circuit increases.

DETAILED DESCRIPTION

According to embodiments, there is provided a voltage regulator that protects a load circuit from being exposed to a voltage that is higher than a specified operating voltage In general, one embodiment provides a voltage regulator comprising a first power source terminal at which an input voltage can be applied and a second power source terminal at which a power source reference voltage (e.g., ground potential) can be applied. The voltage regulator has an output terminal at which an output voltage is output to a load circuit. An operational amplifier is configured to compare a predetermined reference voltage to a feedback voltage that is proportional to the output voltage and then to provide an output signal corresponding to the comparison. A detecting circuit detects an operating state of the operational amplifier and outputs a control signal corresponding to the detected operating state. An output transistor connected between the first power source terminal and the output terminal is configured to change a conductance according to the output signal from the operational amplifier and the control signal from the detecting circuit. The control signal from the detecting circuit causes the output transistor to become non-conductive when the operational amplifier is not operating while the input voltage is being applied to the first power source terminal. Thus, the control signal prevents the output transistor from being conductive when the operational amplifier is not within its operating voltage range.

Below, various embodiments are described in detail with reference to the appended drawings. However, these example embodiments are not intended to limit the scope of the present disclosure.

First Embodiment

Figure 1:
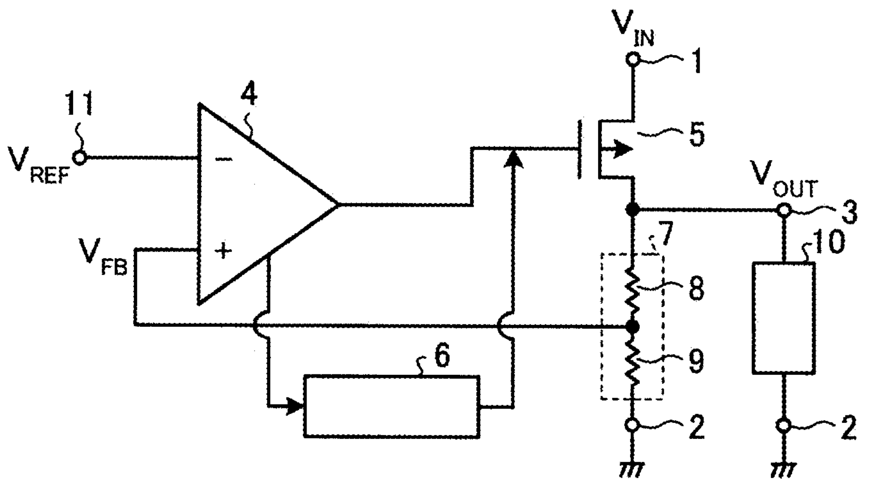
FIG. 1 is a schematic diagram that depicts a voltage regulator circuit according to a first embodiment.

FIG. 1 is a diagram that depicts the configuration of the voltage regulator according to a first embodiment. An input voltage VIN is supplied to a first power source terminal 1. A ground potential (power supply reference voltage) is supplied to a second power source terminal 2. An output voltage VOUT is output at an output terminal 3. A voltage-dividing circuit 7, which has a resistor 8 and a resistor 9, is connected between the output terminal 3 and the second power source terminal 2. A feedback voltage VFB that is proportional to the output voltage VOUT is obtained at the connecting part of the resistors 8 and 9, that is, the feedback voltage VFB is supplied from a node between the resistors 8 and 9. A predetermined reference voltage VREF is supplied to the inverting input terminal (−) of the operational amplifier 4 via a terminal 11. That is, terminal 11 is electrically connected to the inverting input terminal (−) of the operational amplifier 4. The feedback voltage VFB, supplied from the voltage-dividing circuit 7, is supplied to the non-inverting input terminal (+) of the operational amplifier 4. A source electrode of an output transistor 5 is connected to the first power source terminal 1, and an output signal of the operational amplifier 4 is supplied to a gate electrode of the output transistor 5. The drain electrode of the output transistor 5 is connected to the output terminal 3. Output voltage VOUT at the output terminal 3 is supplied to a load circuit 10 that is connected between the output terminal 3 and the second power source terminal 2 (depicted as a ground potential).

The operational amplifier 4 compares the reference voltage VREF and the feedback voltage VFB and outputs an output signal that corresponds to that comparison. The output signal is supplied to the gate electrode of the output transistor 5, and a feedback control operation is carried out to make the feedback voltage VFB from the voltage-dividing circuit 7 and the reference voltage VREF equal by switching the conductance state of the output transistor 5 between on and off, which alters VOUT accordingly, which in turn alters VFB.

A detecting circuit 6 is connected to the operational amplifier 4. The detecting circuit 6 is a circuit that monitors the operating state of the operational amplifier 4. In a state where the input voltage VIN is being supplied to the first power source terminal 1 and the operational amplifier 4 is not operating, a signal to turn off the output transistor 5 is output from the detecting circuit 6.

In the first embodiment, even though the input voltage VIN is being supplied to the first power source terminal 1, the output transistor 5 is turned off when the operational amplifier 4 is not operating. With this, the output voltage VOUT of the output terminal 3 becomes 0 V (assuming terminal 2 is at a ground potential (0V) as depicted), and cases where an unintended high voltage that exceed the specifications of the load circuit 10 could be output from the output terminal 3 can be prevented.

For example, when there is a operating specification in which, when the input voltage VIN is 1.8 V±0.15 V, the output voltage VOUT is 1.2 V±0.1 V, a situation could occur where the operational amplifier 4 will not operate when the input voltage VIN is around 1.5 V (i.e., less than 1.8 V minus 0.15 V). But in the first embodiment, a low level signal would be supplied to the output transistor 5, which is a p-channel metal oxide semiconductor (PMOS) transistor, and the output transistor 5 would thus be turned on, and the output voltage VOUT could become a voltage around 1.5 V, which corresponds to the input voltage. Thus, even though the input voltage is lower than the normal operating range, the output voltage VOUT would exceed the desired output range of 1.2 V±0.1 V.

In the first embodiment, when the operational amplifier 4 is not operating, the output transistor 5 is turned off by detecting circuit 6. Therefore, the output voltage VOUT will equal 0V when the operational amplifier is not operating and the output voltage VOUT will not exceed a desired level.

For example, in a case where an element, such as a thin-film transistor, is used for the load circuit 10, a voltage regulator that ensures that a high voltage that exceeds the specifications is not applied is important to prevent irreversible damage to the transistor.

The voltage regulator of the first embodiment is configured so that a detecting circuit 6 detects when the operational amplifier 4 is not operating. With that detection result, the conductive state of the output transistor 5 is controlled. Because there is no need to monitor the power source voltage directly or to delay the operation of the voltage regulator until the detected power source voltage is sufficiently high, the starting up operation of the voltage regulator of the first embodiment is quick.

Second Embodiment

Figure 2:
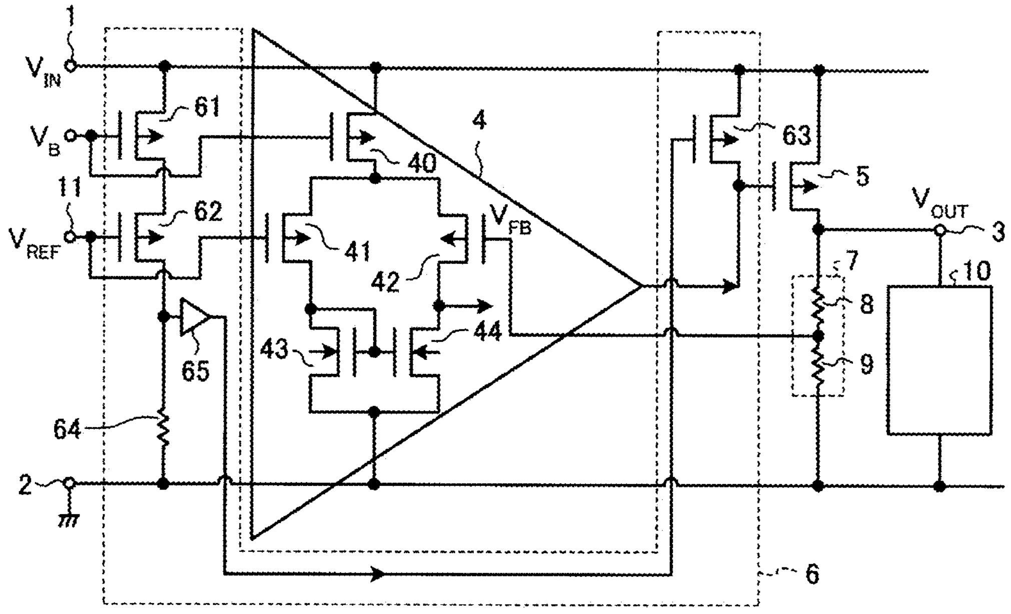
FIG. 2 is a schematic diagram that depicts a voltage regulator circuit according to a second embodiment.

FIG. 2 is a diagram that depicts the second embodiment. FIG. 2 shows an embodiment with a specific example configuration of the detecting circuit 6 and the operational amplifier 4. The elements that are the same as in FIG. 1 are given the same reference numerals, and associated descriptions may be omitted.

The operational amplifier 4 of this embodiment includes a differential amplifier with the configuration depicted in FIG. 2. A PMOS transistor 40 has a source electrode connected to the first power source terminal 1, and a bias voltage VB is supplied to the gate electrode of PMOS transistor 40. The source electrodes of PMOS transistors 41 and 42 are connected to the drain electrode of the PMOS transistor 40. The drain electrode of an n-channel metal oxide semiconductor (NMOS) transistor 43 is connected to the drain electrode of the PMOS transistor 41. The source electrode of the NMOS transistor 43 is connected to the second power source terminal 2. The drain electrode of the PMOS transistor 42 is connected to the drain electrode of the NMOS transistor 44. The source electrode of the NMOS transistor 44 is connected to the second power source terminal 2. The gate electrodes of the NMOS transistors 43 and 44 have a common connection and are connected to the drain electrode of the PMOS transistor 41. The PMOS transistor 40 is the current source of the differential amplifier, and the PMOS transistors 41 and 42 are the differential pair of the differential amplifier. The NMOS transistors 43 and 44 comprise the load circuit of the differential amplifier.

A reference voltage VREF is applied to the gate of the PMOS transistor 41. The feedback voltage VFB from the voltage-dividing circuit 7 is applied to the gate of the PMOS transistor 42.

The detecting circuit 6 includes a PMOS transistor 61 with a gate electrode connected to the gate electrode of the PMOS transistor 40. The gate of the PMOS transistor 40 controls the current source of the differential amplifier. The source electrode of the PMOS transistor 61 is connected to the first power source terminal 1. A bias voltage VB is applied to the gates of PMOS transistors 40 and 61.

The detecting circuit 6 includes a PMOS transistor 62 which has a gate electrode connected to the gate electrode of the PMOS transistor 41. The source electrode of the PMOS transistor 62 is connected to the drain electrode of the PMOS transistor 61. The drain electrode of the PMOS transistor 62 is connected to the second power source terminal 2 via a resistor 64. A reference voltage VREF is applied to the gate electrodes of PMOS transistors 41 and 62.

The detecting circuit 6 further includes an amplifier circuit 65 and a PMOS transistor 63. The input terminal of the amplifier circuit 65 is connected to a node (a connecting part) between the PMOS transistor 62 and resistor 64. The output of the amplifier circuit 65 is supplied to the gate electrode of the PMOS transistor 63. The source electrode of the PMOS transistor 63 is connected to the first power source terminal 1, and the drain electrode is connected to the gate of the output transistor 5.

The output of the operational amplifier 4 is supplied to the gate electrode of the output transistor 5. The operational amplifier 4 supplies the output according to the output from the differential amplifier which is built in the operational amplifier 4. However, the details of this configuration are omitted from the figures to simplify the schematic depictions.

The gate electrode of the PMOS transistor 61 is connected to the gate electrode of the PMOS transistor 40. The gate electrode of the PMOS transistor 62 is connected to the gate electrode of the PMOS transistor 41. By making the dimensions of the PMOS transistors 40 and 61 and the PMOS transistors 41 and 62 the same, the same electric current that is applied to the PMOS transistors 40 and 41 is applied to the PMOS transistors 61 and 62 of the detecting circuit 6.

By detecting the operating state of the PMOS transistor 41 with a reference voltage applied using the detecting circuit 6 rather than by monitoring the feedback voltage VFB, which varies according to the output voltage VOUT, the operating state of the operational amplifier 4 can be reliably detected. That is, in the case that the input voltage VIN is low, the feedback voltage VFB would also becomes low. For this reason, the PMOS transistor 42 to which the feedback voltage VFB is applied is put into a state such that it can be easily turned on. In contrast, the PMOS transistor 41 which receives the reference voltage VREF, which is a fixed voltage, is difficult to turn on. When the input voltage VIN is low, the operating state of the differential amplifier, and thus the operating state of the operational amplifier 4, which includes the differential amplifier, can be reliably detected by detecting the operating state of the PMOS transistor 41.

In a state where the operational amplifier 4 is not operating, that is, when the drain current of the PMOS transistor 62 of the detecting circuit 6 is not being output, the drain of the PMOS transistor 62 and the potential of the connecting part (connecting node between PMOS transistor 62 and resistor 6) of the resistor 64 reaches a Low level. This signal is then amplified by the amplifier circuit 65 and supplied to the gate of the PMOS transistor 63. As a result, PMOS transistor 63 turns on. As a result, a voltage that is nearly equivalent to the input voltage VIN is applied to the gate of the output transistor 5. With this, the output transistor 5 turns off, and the output voltage VOUT of the output terminal 3 becomes 0 V. Therefore, when the operational amplifier 4 is in a non-operating state, the output voltage VOUT of the output terminal 3 becomes 0 V, and cases where unintended high voltages that exceed the specifications are applied to the load circuit 10 can be prevented. Further, because there is no need to monitor the power source voltage and to delay the operation of the voltage regulator until the power source voltage is sufficiently high, the starting up of the operation of the voltage regulator of the second embodiment is quick.

Third Embodiment

Figure 3:
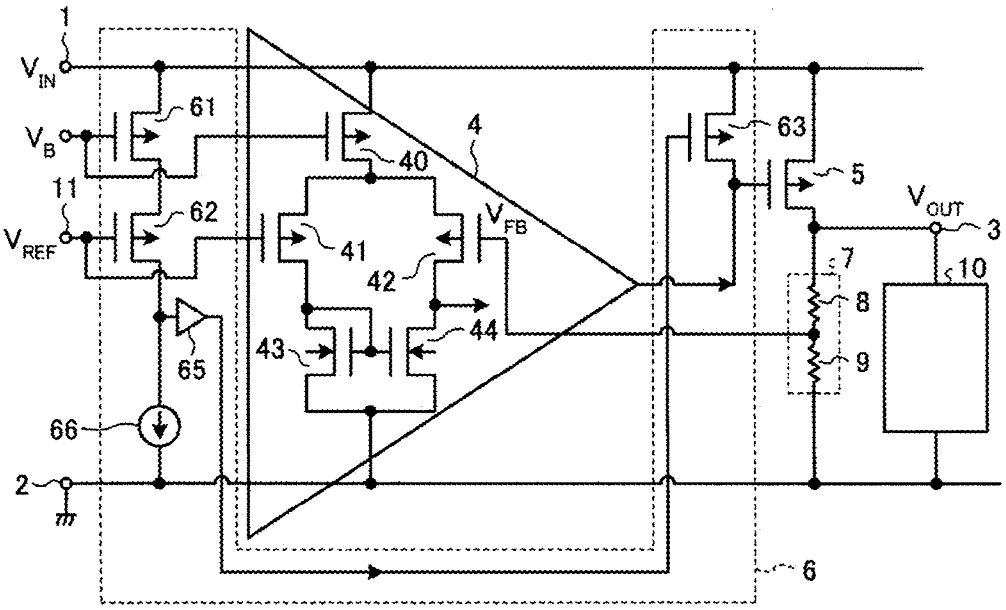
FIG. 3 is a schematic diagram that depicts a voltage regulator circuit according to a third embodiment.

FIG. 3 is a diagram that depicts a third embodiment. The compositional elements that are the same as in FIG. 2 are given the same reference labels, and their associated descriptions may be omitted.

In the third embodiment, a constant current source 66 is connected to the drain of the PMOS transistor 62. In the case that a current of the PMOS transistors 61 and 62 that supply a current that corresponds to the current of the PMOS transistors 40 and 41 is not being supplied; that is, in the case that the operational amplifier 4 is not operating, the potential of the connecting part (connecting node) of the PMOS transistor 62 and the constant current source 66 reaches a Low level. This signal is amplified by the amplifier circuit 65 and is supplied to the gate electrode of the PMOS transistor 63. With this, the PMOS transistor 63 turns on, and a voltage that is nearly equivalent to the input voltage VIN is supplied to the gate electrode of the output transistor 5, and the output transistor 5 consequently turns off. With this, the output voltage VOUT of the output terminal 3 becomes 0 V. For this reason, when the operational amplifier 4 is not operating, cases where unintended high voltages that exceed the specifications are applied to the load circuit 10 can be prevented. Further, because there is no need to monitor the power source voltage and to delay the operation of the voltage regulator until the power source voltage is sufficiently high, the starting up of the operation of the voltage regulator of the third embodiment is quick.

Fourth Embodiment

Figure 4:
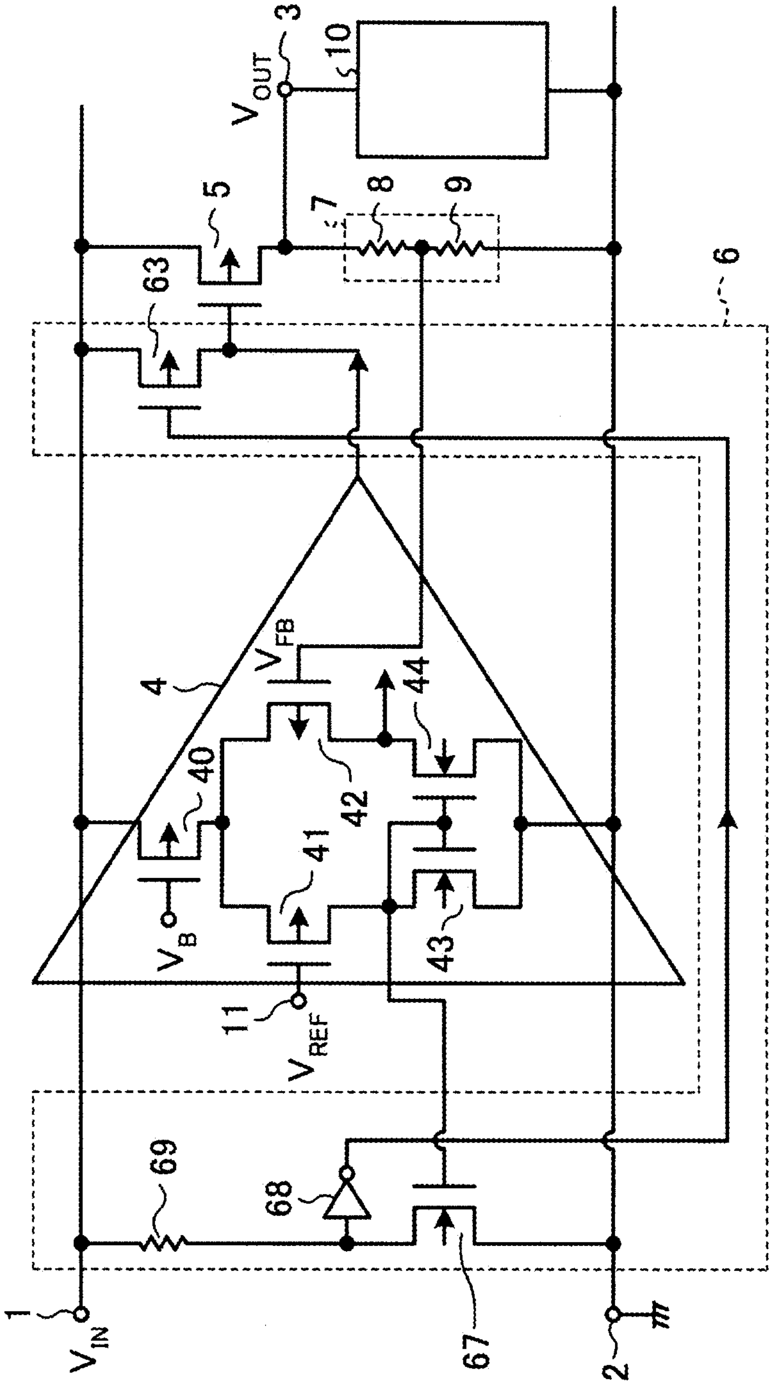
FIG. 4 is a schematic diagram that depicts a voltage regulator circuit according to a fourth embodiment.

FIG. 4 is a diagram that depicts a fourth embodiment. The compositional elements that are the same as the third embodiment in FIG. 3 are given the same reference labels, and their associated descriptions may be omitted.

In the fourth embodiment, the detecting circuit 6 monitors the operating state of the operational amplifier 4 by monitoring the current that is applied to the transistor of the load circuit that is connected with the differential pair of the differential amplifier of the operational amplifier 4. The detecting circuit 6 includes an NMOS transistor 67. The gate electrode of the NMOS transistor 67 is connected to the gate electrodes of the NMOS transistors 43 and 44 that comprise the load circuit of the differential amplifier of the operational amplifier 4. Regarding the NMOS transistor 67 and the NMOS transistor 43, the gate electrode of each is connected to the other, and each drain electrode of the two respective transistors 43 and 67 is connected to the second power source terminal 2, so the NMOS transistors 43 and 67 comprise a current mirror circuit. Thus, by making the dimensions of the NMOS transistor 43 and the NMOS transistor 67 the same, the same drain current is applied to the NMOS transistor 67 as is applied to the NMOS transistor 43. The drain current of the NMOS transistor 43 is equal to the drain current of the PMOS transistor 41 that is one transistor in the differential pair of the differential amplifier of the operational amplifier 4. Therefore, a current that is equivalent to the drain current of the PMOS transistor 41 is applied to the drain of the NMOS transistor 67. That is, by detecting the drain current of the NMOS transistor 67, the operating state of the operational amplifier 4 can be detected.

In the case that a current is not applied to the PMOS transistor 41, current is also not applied to the drain of the NMOS transistor 67 of the detecting circuit 6. For this reason, the potential of the connecting part (connecting node) of the NMOS transistor 67 and the resistor 69 reaches a High level. This signal is inverted by an inverter 68 and supplied to the gate of the PMOS transistor 63. With this Low level signal (i.e., inverted High level signal), the PMOS transistor 63 is put into an on state, and a voltage that is nearly equivalent to the input voltage VIN is applied to the gate electrode of the output transistor 5, causing the output transistor 5 to be turned off. With this, the output voltage VOUT of the output terminal 3 becomes 0 V.

With such an operation, when the operational amplifier 4 is not operating, cases where unintended high voltages that exceed the specifications are applied to the load circuit 10 can be prevented. Further, because there is no need to monitor the power source voltage and to delay the operation of the voltage regulator until the power source voltage is sufficiently high, the starting up of the operation of the voltage regulator of the fourth embodiment is quick.

Fifth Embodiment

Figure 5:
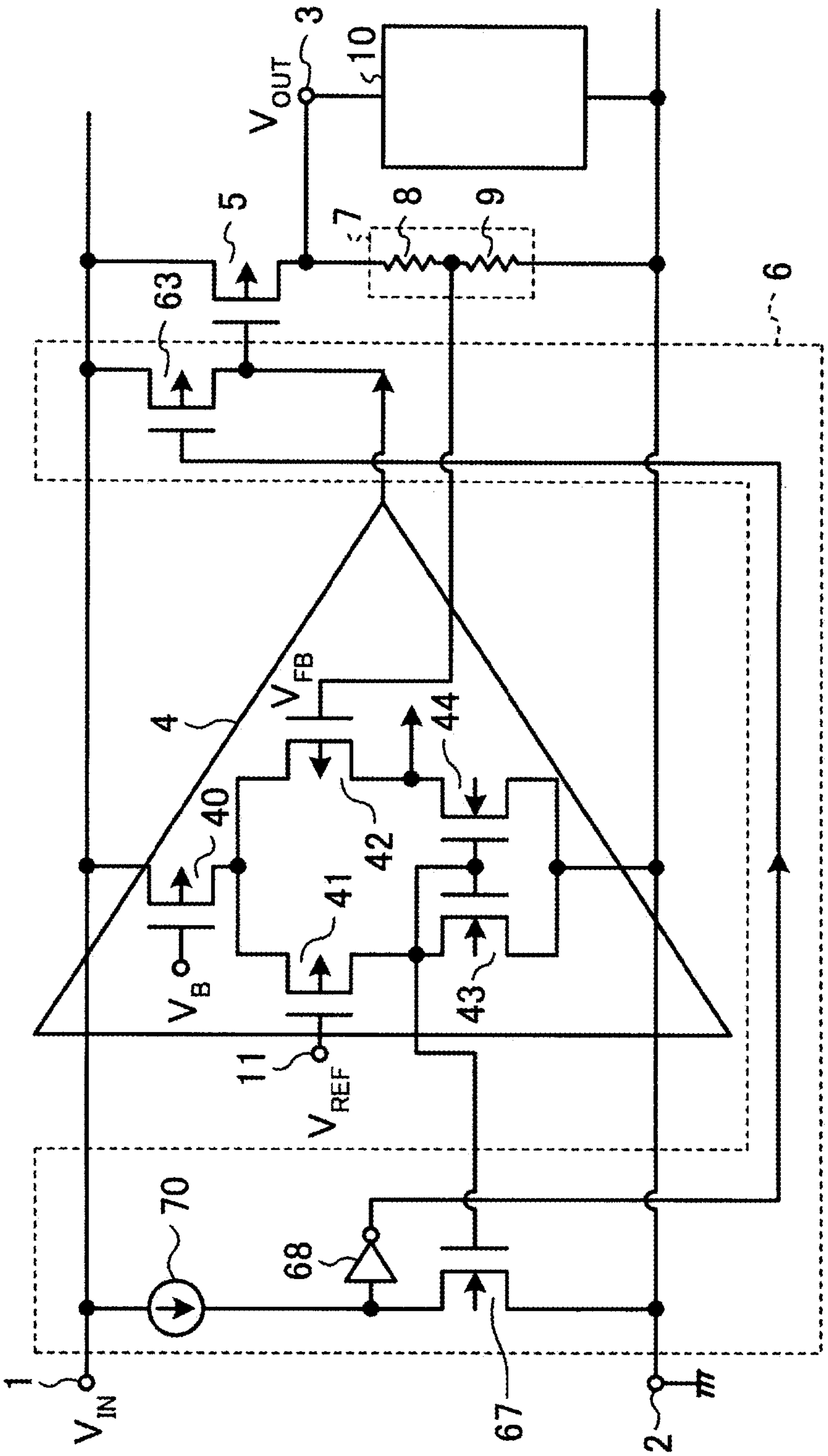
FIG. 5 is a schematic diagram that depicts a voltage regulator circuit according to a fifth embodiment.

FIG. 5 is a diagram that depicts a fifth embodiment. The compositional elements that are the same as the fourth embodiment of FIG. 4 are given the same reference labels, and their descriptions may be omitted. In the fifth embodiment, a constant current source 70 is connected to the drain electrode of the NMOS transistor 67. In the case that a current is not applied to the drain electrode of the NMOS transistor 43, current is also not applied to the drain electrode of the NMOS transistor 67. For this reason, the potential of the connecting part (connecting node) of the drain of the NMOS transistor 67 and the constant current source 70 reaches a High level. This signal is inverted by the inverter 68 and is applied to the gate electrode of the PMOS transistor 63. With application of this Low level signal (i.e., inverted High level signal), the PMOS transistor 63 turns on, and a voltage that is nearly equivalent to the input voltage VIN is supplied to the gate electrode of the output transistor 5, and the output transistor 5 turns off. For this reason, the output voltage VOUT of the output terminal 3 becomes 0 V, and when the operational amplifier 4 is not operating, cases where unintended high voltages that exceed the specifications are applied to the load circuit 10 can be prevented. Further, because there is no need to monitor the power source voltage and to delay the operation of the voltage regulator until the power source voltage is sufficiently high, the starting up of the operation of the voltage regulator of the fifth embodiment is quick.

Sixth Embodiment

Figure 6:
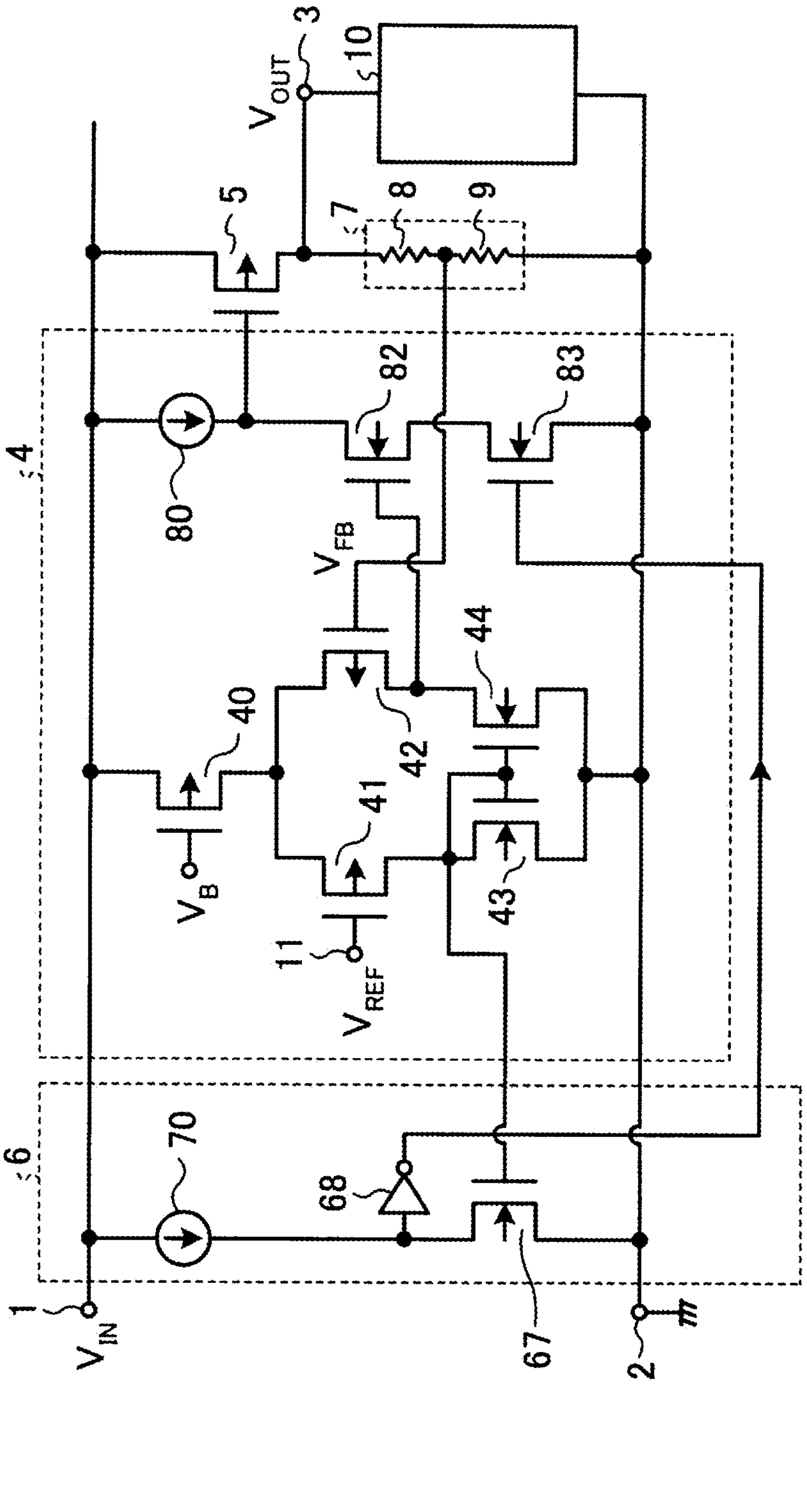
FIG. 6 is a schematic diagram that depicts a voltage regulator circuit according to a sixth embodiment.

FIG. 6 is a diagram that depicts a sixth embodiment. The compositional elements that are the same as the fifth embodiment of FIG. 5 are given the reference labels, and their descriptions may be omitted. In the sixth embodiment, the detection results of the detecting circuit 6 are fed back to the operational amplifier 4. The source/drain paths of the NMOS transistors 82 and 83 are connected between the gate electrode of the output transistor 5 and the second power source terminal 2. That is, the drain electrode of the NMOS transistor 82 is connected to the gate electrode of the output transistor 5. The source electrode of the NMOS transistor 82 is connected to the drain electrode of the NMOS transistor 83. The source electrode of the NMOS transistor 83 is connected to the second power source terminal 2. The gate electrode of the NMOS transistor 82 is connected to the drain electrode of the PMOS transistor 42. The NMOS transistors 82 and 83 comprise an output step of the operational amplifier 4. That is, the signal corresponding to the comparison results of the reference voltage VREF and the feedback voltage VFB from the differential amplifier is supplied to the output transistor 5 from the drain electrode of the NMOS transistor 82. A constant current source 80 is connected between the drain electrode of the NMOS transistor 82 and the first power source terminal 1. The output signal of the detecting circuit 6 is supplied to the gate electrode of the NMOS transistor 83.

In the case that a drain current is not applied to the PMOS transistor 41 because the drain current of the NMOS transistor 67 of the detecting circuit 6 is also not applied, the potential of the connecting part (connecting node) of the NMOS transistor 67 and the constant current source 70 reaches a High level. This signal is inverted by the inverter 68 and supplied to the gate of the NMOS transistor 83. With this, because a Low level signal (i.e., an inverted High level signal) is applied to the NMOS transistor 83, it is put into an off state. With the NMOS transistor 83 turning off, the drain current of the NMOS transistor 82 is also not applied. For this reason, the potential of the connecting part (connecting node) of the NMOS transistor 82 and the constant current source 80 reaches a High level, and the output transistor 5 turns off. With this, the output voltage VOUT of the output terminal 3 becomes 0 V. With such an operation, when the operational amplifier 4 is not operating, cases where unintended high voltages that exceed the specifications are applied to the load circuit 10 can be prevented. Further, because there is no need to monitor the power source voltage and to delay the operation of the voltage regulator until the power source voltage is sufficiently high, the starting up of the operation of the voltage regulator of the sixth embodiment is quick.

The circuit configuration described in the embodiments of FIG. 2 through FIG. 5, that is, the configuration where a control signal of the detecting circuit 6 is supplied to the gate of the PMOS transistor 63 the source/drain of which are connected between the source/gate of the output transistor 5, and the circuit configuration described in the embodiment shown in FIG. 6, that is, the configuration where the output of the detecting circuit 6 is fed back to the operational amplifier 4 and the output transistor 5 is turned off with the output signal of the operational amplifier 4, can be installed at the same time. In this configuration, the conduction of the output transistor 5 is also controlled by the output of the detecting circuit 6.

While certain embodiments have been described, these embodiments have been presented by way of example only and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
- a first circuit; and
- a voltage regulator electrically connected to the first circuit and including:
- a first terminal;
- a second terminal;
- a third terminal;
- a first wiring connected to the first terminal;
- a second wiring connected to the second terminal;
- a second circuit electrically connected to the first and second wirings, including a first transistor, and configured to operate on a basis of a first voltage and a second voltage both provided to the second circuit, the first voltage being proportional to a third voltage on the third terminal;
- a second transistor electrically connected to the first wiring and the third terminal; and
- a third circuit including a third transistor electrically connected to the first wiring, the third circuit being configured to control the second transistor to turn on or turn off on a basis of current flowing through the third transistor, the current flowing through the third transistor corresponding to current flowing through the first transistor, the current flowing through the first transistor varying on a basis of a difference between the first and second voltages.

2. The semiconductor device according to claim 1, wherein
the third transistor is directly connected to the first wiring.

3. The semiconductor device according to claim 1, wherein the third transistor is directly connected to the second wiring.

4. The semiconductor device according to claim 1, wherein the second circuit includes a differential amplifier circuit.

5. The semiconductor device according to claim 1, wherein the second circuit includes an operational amplifier circuit.

6. The semiconductor device according to claim 1, wherein the third transistor is electrically connected to both the first and second wirings.

7. The semiconductor device according to claim 1, wherein the third circuit further comprises a fourth transistor, and the fourth transistor is configured to switch a state of the second transistor between a conductive state and a non-conductive state.

8. The semiconductor device according to claim 7, wherein the third transistor is electrically connected to a gate of the fourth transistor.

9. The semiconductor device according to claim 7, wherein the fourth transistor is configured to switch the state of the second transistor based on a signal corresponding to the current flowing through the third transistor.

10. The semiconductor device according to claim 7, wherein the fourth transistor is electrically connected to a gate of the second transistor.

11. The semiconductor device according to claim 10, wherein the fourth transistor is electrically connected to the first wiring.

12. The semiconductor device according to claim 10, wherein the fourth transistor is electrically connected to the second wiring.

13. The semiconductor device according to claim 1, further comprising:

a fourth terminal to which the second voltage is configured to be supplied.

14. The semiconductor device according to claim 1, wherein the second circuit is configured to output a signal to the second transistor.

15. The semiconductor device according to claim 1, further comprising:

a fourth circuit configured to supply, as a feedback voltage, the first voltage to the second circuit.

16. The semiconductor device according to claim 15, wherein the fourth circuit includes a voltage-dividing circuit and is connected to the second transistor and the second wiring.

17. The semiconductor device according to claim 15, wherein the fourth circuit includes a plurality of resistors.

18. The semiconductor device according to claim 17, wherein the plurality of resistors comprises a first resistor and a second resistor connected to each other in series, the first resistor is directly connected to the second wiring, and the second resistor is directly connected to the third terminal.

19. The semiconductor device according to claim 18, wherein a node that connects the first and second resistors to each other has a voltage level of the feedback voltage supplied to the second circuit.

20. The semiconductor device according to claim 19, wherein the second circuit includes a fifth transistor connected to the first transistor, and the feedback voltage is supplied directly to a gate of the fifth transistor.

* * * * *